United States Patent
Kasslin et al.

(10) Patent No.: US 9,055,101 B2
(45) Date of Patent: Jun. 9, 2015

(54) NEAR FIELD COMMUNICATION SECURITY

(75) Inventors: Kimmo Kasslin, Helsinki (FI); Jarno Niemelä, Helsinki (FI)

(73) Assignee: F-Secure Corporation, Helsinki (FI)

( * ) Notice: Subject to any disclaimer, the term of this patent is extended or adjusted under 35 U.S.C. 154(b) by 358 days.

(21) Appl. No.: 13/271,519

(22) Filed: Oct. 12, 2011

(65) Prior Publication Data

US 2013/0095751 A1    Apr. 18, 2013

(51) Int. Cl.
*H04B 5/00* (2006.01)
*H04L 29/06* (2006.01)
*H04W 12/12* (2009.01)

(52) U.S. Cl.
CPC ......... *H04L 63/1466* (2013.01); *H04L 63/0492* (2013.01); *H04W 12/12* (2013.01)

(58) Field of Classification Search
CPC .... H04W 4/008; H04B 5/0025; H04B 5/0062
USPC ............... 455/41.1–41.3, 410, 411; 370/230; 705/14.47, 44, 39, 64–79, 16, 17, 21, 2
See application file for complete search history.

(56) References Cited

U.S. PATENT DOCUMENTS

| | | | | |
|---|---|---|---|---|
| 7,590,409 B2 * | 9/2009 | Morita | ........................ | 455/411 |
| 7,647,024 B2 * | 1/2010 | Wang et al. | ................... | 455/41.2 |
| 7,941,123 B2 * | 5/2011 | Yang et al. | ................. | 455/412.1 |
| 8,095,113 B2 * | 1/2012 | Kean et al. | .................... | 455/410 |
| 8,126,967 B2 * | 2/2012 | Carlson et al. | ................ | 709/204 |
| 8,335,489 B2 * | 12/2012 | Hamada | ........................ | 455/411 |
| 8,489,456 B2 * | 7/2013 | Burgess et al. | ............ | 705/14.47 |
| 8,718,626 B2 * | 5/2014 | Rose et al. | ..................... | 455/416 |
| 8,731,583 B2 * | 5/2014 | Wengrovitz | .............. | 455/456.3 |
| 2007/0136585 A1 | 6/2007 | Diorio et al. | .................. | 713/168 |
| 2008/0100443 A1 | 5/2008 | Grunwald et al. | ........ | 340/572.1 |
| 2008/0168270 A1 | 7/2008 | Kulakowski et al. | ......... | 713/168 |
| 2009/0068982 A1 | 3/2009 | Chen et al. | ..................... | 455/407 |
| 2009/0170480 A1 * | 7/2009 | Lee | ............................. | 455/414.1 |
| 2010/0161410 A1 | 6/2010 | Tulloch | ...................... | 705/14.45 |
| 2010/0274720 A1 * | 10/2010 | Carlson et al. | ................. | 705/44 |
| 2011/0179465 A1 * | 7/2011 | Major et al. | ...................... | 726/2 |
| 2011/0295707 A1 * | 12/2011 | Gui et al. | ........................ | 705/18 |
| 2014/0059643 A1 * | 2/2014 | Azuma | ............................. | 726/2 |

FOREIGN PATENT DOCUMENTS

EP  2395464 A1 * 12/2011
JP  2008233975 A  10/2008

* cited by examiner

*Primary Examiner* — Edward Urban
*Assistant Examiner* — Max Mathew
(74) *Attorney, Agent, or Firm* — Harrington & Smith

(57) ABSTRACT

In accordance with an example embodiment of the present invention, there is provided a computing device, including at least one processor; and at least one memory including computer program code the at least one memory and the computer program code configured to, with the at least one processor, cause the device to perform at least the following: receive near field communication device data related to a specific NFC device; generate a reputation query on the basis of the received NFC device data; send the generated reputation query to a service provider; receive reputation data, retrieved from a reputation database of NFC device reputation information, related to the specific NFC device from the service provider; and take further action on the basis of the received reputation relating to the specific NFC device.

23 Claims, 3 Drawing Sheets

NEAR FIELD COMMUNICATION SECURITY

TECHNICAL FIELD

The exemplary and non-limiting embodiments of the present application relate generally to methods, apparatuses and computer programs and, more specifically, to the field of near field communication security.

BACKGROUND

A growing number of applications require use of a form of very short-range wireless communications. One example of a technology that enables this kind of communication is called near field communications or NFC. NFC is a standards-based technology that aims to provide secure two-way interactions between electronic devices. NFC provides communication up to distances of about 4 or 5 centimeters or less. This makes communications between devices more secure.

NFC and corresponding technology can be used in many different applications/devices, such as mobile phones, PDAs, computers, check-out registers or point-of-sale equipment, vending machines, parking meters, automated teller machines (ATM) etc. NFC devices are often used in payment and other financially critical applications. For example several new mobile phone models have NFC support intended for wireless credit card payment acceptance.

Although the communication range of NFC is limited to a few centimeters, there are still different types of security threats related to NFC. NFC has no protection against eavesdropping and it can be vulnerable to data modifications, data corruption and man-in-the-middle attacks. A typical NFC attack can be done with powerful directional antennas targeting somebody who is authorizing a payment at a shopping terminal or at another place where a phone can be used for wireless payment authorization. Using the antenna, the attacker can force the phone to pair with his system instead of the intended NFC terminal and is thus able to manipulate the transaction. Another type of attack is to use Smart Poster spoofing vulnerabilities to trick NFC clients into paying for merchandise that will be delivered to another vending machine which in turn is monitored by the attacker. Thus, there is a real need to improve security issues related to near field communication techniques.

SUMMARY

The claims describe various aspects of examples of the invention.

According to one aspect of the present invention, there is provided a method, comprising: receiving near field communication (NFC) device data related to a specific NFC device; generating a reputation query on the basis of the received NFC device data; sending the generated reputation query to a service provider; receiving reputation data, retrieved from a reputation database of NFC device reputation information, related to the specific NFC device from the service provider; and on the basis of the received reputation relating to the specific NFC device, taking further action.

According to a second aspect of the present invention, there is provided a computing device, comprising: at least one processor; and at least one memory including computer program code, the at least one memory and the computer program code configured to, with the at least one processor, cause the device to perform at least the following: receive near field communication (NFC) device data related to a specific NFC device; generate a reputation query on the basis of the received NFC device data; send the generated reputation query to a service provider; receive reputation data, retrieved from a reputation database of NFC device reputation information, related to the specific NFC device from the service provider; and take further action on the basis of the received reputation relating to the specific NFC device.

According to a third aspect of the present invention, there is provided a method, comprising: maintaining a reputation database comprising near field communication (NFC) device reputation information; receiving, from a computing device, a reputation query comprising NFC device data of a specific NFC device; retrieving the reputation data relating to the specific NFC device from the reputation database; and sending the retrieved reputation data to the computing device.

According to a fourth aspect of the present invention, there is provided a server, comprising: at least one processor; and at least one memory including computer program code, the at least one memory and the computer program code configured to, with the at least one processor, cause the server to perform at least the following: maintain a reputation database comprising near field communication (NFC) device reputation information; receive, from a computing device, a reputation query comprising NFC device data of a specific NFC device; retrieve the reputation data relating to the specific NFC device from the reputation database; and send the retrieved reputation data to the computing device.

According to a fifth aspect of the present invention, there is provided a computer program product comprising a computer-readable medium bearing computer program code embodied therein for use with a computer, the computer program code comprising: code for receiving near field communication (NFC) device data related to a specific NFC device; code for generating a reputation query on the basis of the received NFC device data; code for sending the generated reputation query to a service provider; code for receiving reputation data, retrieved from a reputation database of NFC device reputation information, related to the specific NFC device from the service provider; and code for taking further action on the basis of the received reputation relating to the specific NFC device.

According to a sixth aspect of the present invention, there is provided a computer program product comprising a computer-readable medium bearing computer program code embodied therein for use with a computer, the computer program code comprising: code for maintaining a reputation database comprising near field communication (NFC) device reputation information; code for receiving, from a computing device, a reputation query comprising NFC device data of a specific NFC device; code for retrieving the reputation data relating to the specific NFC device from the reputation database; and code for sending the retrieved reputation data to the computing device.

BRIEF DESCRIPTION OF THE DRAWINGS

The accompanying drawings provide a more complete understanding of the example embodiments of the present invention, according to the following descriptions.

DETAILED DESCRIPTION OF THE DRAWINGS

Example embodiments of the present invention are later described in more detail with reference to the accompanying drawings, in which some embodiments of the invention are shown. The invention may be embodied in many different forms and should not be construed as limited to the embodiments presented here. Although the specification may refer to "an", "one", or "some" embodiment in several locations, this does not necessarily mean that each such reference is to the same embodiment, or that the feature only applies to a single embodiment. Single features of different embodiments may also be combined to provide other embodiments.

The present invention can apply to any terminal, server, corresponding component, or to any communication system or combination of different communications systems that support the required functionality. Due to the rapid development of the specifications of computer systems and protocols that are used, all words and expressions should be interpreted broadly; they are intended only to illustrate the embodiment.

Figure 1:
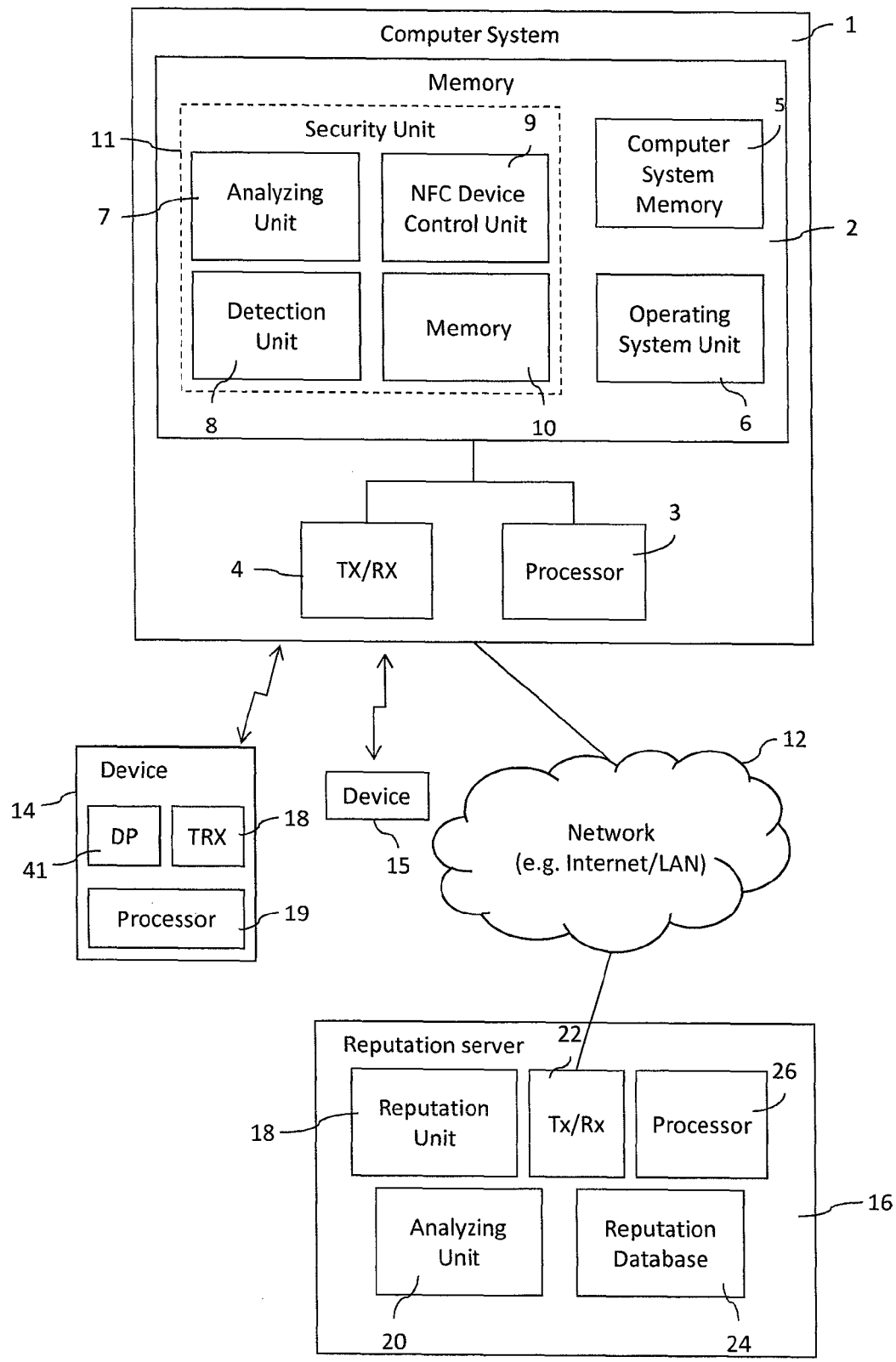
FIG. 1 shows a simplified block diagram that illustrates an example of apparatuses according to the invention.

FIG. 1 illustrates a general example of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in FIG. 1. The connections shown in FIG. 1 are logical connections, and the actual physical connections may be different. It is apparent to a person skilled in the field that the arrangement may also comprise other functions and structures.

FIG. 1 shows an example of a computer system 1 that is suitable for implementing the methods that are described below. The computer system 1 can be implemented as a combination of computer hardware and software. The computer system 1 comprises a memory 2, a processor 3 and a transceiver 4. The memory 2 stores the various programs or executable files that are implemented by the processor 3, and provides a computer system memory 5 that stores any data required by the computer system 1. The programs or executable files that are stored in the memory 2, and implemented by the processor 3, can include an operating system unit 6, an analyzing unit 7, a detection unit 8, and an NFC device control unit 9. The memory 2 also provides a memory 10 that is used by the analyzing unit 7, detection unit 8 and NFC device control unit 9. The analyzing unit 7, detection unit 8, NFC device control unit 9 and the memory 10 can be sub-units of a security unit 12. The transceiver 4 is used to communicate over a network 12 such as a LAN or the Internet. In an embodiment, the transceiver 4 also comprises an NFC transceiver and it may communicate with nearby NFC devices. Typically, the computer system 1 may be a personal computer (PC), laptop, personal data assistant (PDA) or mobile phone, mobile Internet device, gaming device, or any other suitable device.

The example of FIG. 1 also illustrates near field communication devices (NFC device) 14 and 15. The transceiver 4 of the computer system 1 may communicate with the NFC devices 14, 15 over very short wireless connections, such as over a near field communication (NFC) connection. NFC technology operates at a frequency of 13.56 MHz. A connection between two NFC enabled devices is made when they are brought, for example, to less than about 4 centimeters of one another. However, it is possible to have other communication distances as well, for example up to 20 centimeters. In an embodiment, a simple wave or touch can establish an NFC connection between devices, for example, between the computer system 1 and the NFC device 14, 15. The computer system 1 may communicate with NFC devices 14, 15 also over other wireless connections, wired connections and the network 13.

In an embodiment, an NFC device 14, 15 may comprise a processor 19 and a memory unit 41 coupled to a transceiver 18. In some embodiments, the processor 19 and the memory unit 41 may be integrated onto an integrated circuit chip in a single package, or they may be separately disposed. The memory unit 41 may store data that enables a device to receive a service. The transceiver 18 may be an NFC transceiver, and it may transmit data from the memory unit 41, responsive to a magnetic field. In another embodiment, the transceiver 18 may also include a transmitter and a receiver. Additionally, the NFC device 14, 15 may also include other components, for example, transponders, coupling devices, power circuits and modulators, to enable the NFC device 14, 15 to communicate over an NFC link.

In an embodiment, the NFC device 14, 15 may be a discrete device, such as a physical card that includes software and data. The software or the data or both can be stored in the device at the time of manufacture or any time later. In some embodiments, the NFC device 14, 15 may be an NFC reader/writer that is incorporated into an NFC communications-enabled device.

In an embodiment, the NFC device 14, 15 comprises an NFC tag. NFC tags are passive devices that may be used for communicating with active NFC enabled devices. The NFC tags may be used, for example, within applications such as posters and other areas where small amounts of data can be stored and transferred to active NFC devices. The data stored on the NFC tag can be of any form, for example, URLs may be stored to enable the NFC device to find further information. NFC tags have no power of their own, which means that when an NFC enabled device is brought close to or touches the NFC tag, a small amount of power is taken by the NFC tag from the reader/writer to power the tag electronics. After that the NFC tag is enabled to transfer a small amount of information to the reader/writer. The information read from the NFC tag may be text or other data that may be used, for example, to direct the device to a website URL.

The example of FIG. 1 also illustrates a reputation server system 16 that in some embodiments may communicate with the computer system 1 and/or the NFC devices 14, 15. The reputation server 16 may comprise a reputation unit 18, an analyzing unit 20, a transceiver 22, a reputation database 24 and a processor 26.

In an embodiment, the NFC devices 14, 15 may communicate with the computer system 1 via an NFC communications link. The computer system 1 may also communicate with the reputation server system 16 via the network 12. In an embodiment, the detection unit 8 is configured to detect and receive NFC device related data from the NFC devices 14, 15. The data related to the NFC device may include one or more of the following: NEC device identifying information, frequency information, NFC communication data rate, communication mode used, data coding system information, NFC device type, physical location of the NFC device, a uniform resource identifier (URI) provided by the NFC device, textual content of the NFC device, price information associated with the NFC device.

In an embodiment, the analyzing unit 7 may be configured to analyze the received data related to the NFC device (NFC device related data) and generate further data based on the analysis.

It should be noted that the computer system 1, the reputation server 16 and the NFC devices 14, 15 are only examples of apparatuses/systems, and that they may have more or fewer components than shown, may combine two or more components, or may have a different configuration or arrangement of the components.

Figure 2:
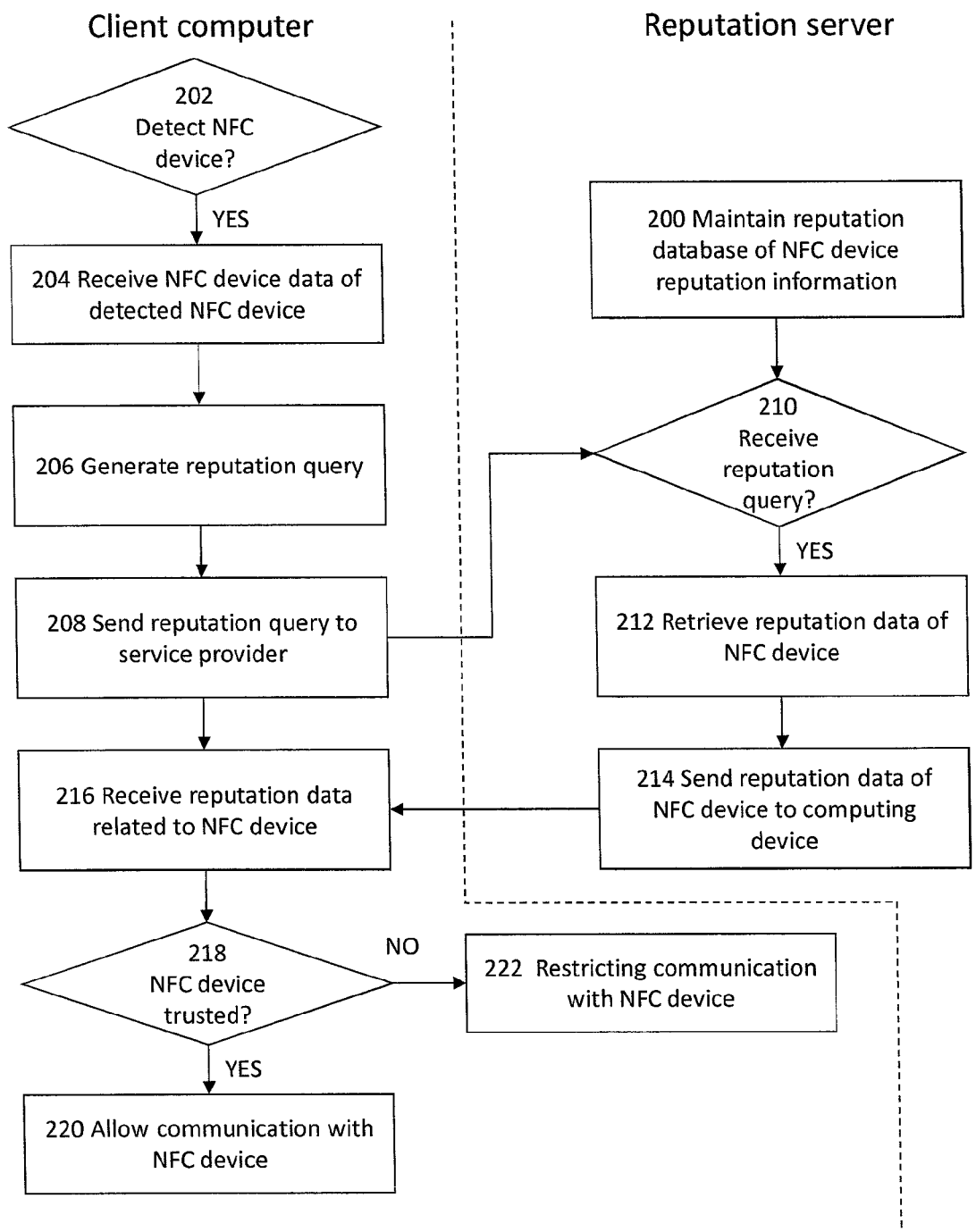
FIG. 2 shows an example of a method.

FIG. 2 is a flow diagram illustrating an example of a process.

In 200, the reputation server 16 maintains a reputation database 24 that comprises NFC device-related reputation information. The reputation database 24 may comprise one or more of the following information:

- Information that identifies the NFC device
- Frequency and communication data rate
- Communication mode used with the NFC device
- RF signal coding system
- Type of NFC device
- Age of NFC device
- Physical location of NFC device
- Known fraud or other security issue history of the NFC terminal
- URI provided by an NFC tag (phone number, URL)
- Textual content of an NFC tag
- Price associated with an NFC tag The reputation database 24 may also comprise any other information that may be beneficial in establishing reputation data related to specific NFC devices. RF-signal coding system information may comprise information on whether the NFC device uses the Manchester or Modified Miller coding schemes on the RF signal to transfer data, for example. Any other information related to the used coding scheme can also be maintained in the reputation database. The information on the type of an NFC device may comprise information, for example, on whether the NFC device is a point of sale terminal, a ticketing terminal, a boarding pass, etc. Price associated with the NFC tag may be related to, for example, a bus fare, an entrance ticket, a purchase price, etc.

In 202, if a client computer 1 detects a nearby NFC device, then 204 is entered.

In 204, the client computer 1 receives NFC device-related data of the detected NFC device. In an embodiment, the client computer receives the NFC device-related data over an NFC connection between the client computer 1 and the NFC device 14, 15. In an embodiment, the client computer 1 may receive NFC device related data also over any other connection and, for example, from another computer device or from a reputation server.

In 206, a reputation query is generated on the basis of the received NFC device data. In an embodiment, the reputation query may also comprise further NFC device-related data, for example, analysis data from the analyzing unit 7 of the client computer 1. The reputation query may also comprise any other data that may be beneficial to a reputation server for determining reputation of the NFC device.

In 208, the generated reputation query is sent to the reputation server 16.

In 210, when the reputation server 16 receives the reputation query, 212 is entered where the reputation data related to the specific NFC device is retrieved from the reputation database 24. The reputation server 16 may determine the reputation of different NFC devices based on many factors. For example, if many queries on a specific NFC device have not been received before, then the NFC device may have a reduced reputation. If it is known that an NFC device at a specific location has been linked to suspicious activities in the past, then the NFC device may have a reduced reputation. It will be apparent to a skilled person that many different factors may affect the reputation of the NFC device and the above are provided as examples only.

Once the reputation check and retrieval from the reputation database has been performed, the reputation server 16 sends a response the client computer 1 in 214.

In 216, the requested reputation data related to the specific NFC device is received by the client computer. The reputation data may be, for example, "good" if the NFC device is known to be a legitimate NFC terminal, "bad" if the NFC device is known to be a suspicious terminal, and "unknown" if the NFC device is unknown to the reputation server 16.

In 218, based on the received reputation data, decisions on further actions can be made. For example, if the NFC device is determined to be trusted, then 220 is entered where communication with the NFC device may be allowed. If the NFC device is determined not to be trusted, then 222 is entered where communication with the NFC device may be restricted.

The processor 3 of the client computer 1 is configured to take further action depending on the received reputation information and/or, for example, based on predetermined settings in the client computer 1. For example, if the reputation data implies that the NFC device is a legitimate terminal, the processor will allow communication with the NFC device. If the reputation data implies that the NFC device is suspicious or unknown, the processor may take action to prevent communication with the NFC device or restrict communication with the NFC device to a predetermined level. This may include, for example, preventing communication with the NFC device in this specific instance, closing a software application related to the process completely, and preventing a software application from taking specific actions, such as making payments, etc. Further, a dialogue may be displayed to the user of the client computer 1 informing the user that a suspicious or unknown NFC device has attempted to contact the client computer 1. The dialogue may give the user the option to allow the NFC device to contact the client computer 1 despite the warnings given to the user.

Figure 3:
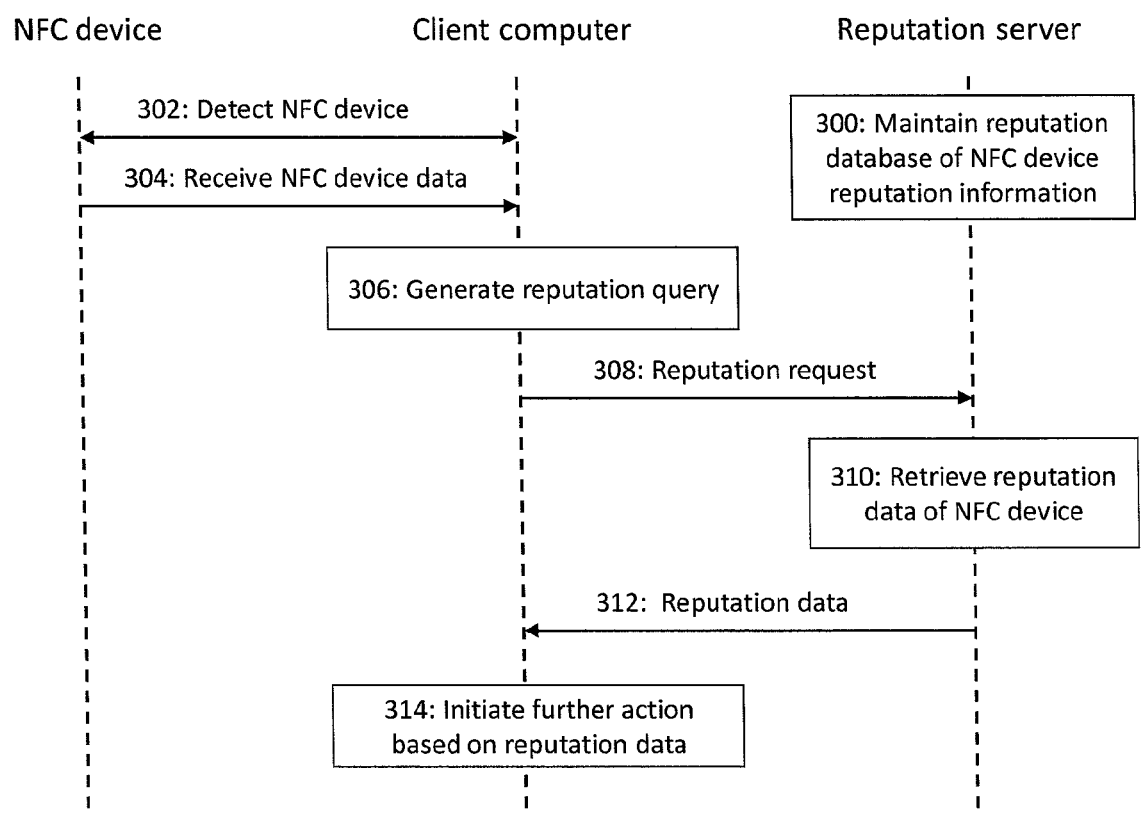
FIG. 3 is a signal sequence diagram showing an example according to an embodiment of the present invention.

FIG. 3 is a signal sequence diagram illustrating an example of the process. At 300, a reputation database that comprises NFC device reputation information is maintained on a reputation server.

In 302, an NFC-enabled client computer and an NFC device may generate a communication link, for example, by the transmission of a radio frequency signal that generates a magnetic field. An NFC device may inductively couple with the magnetic field and modulate a signal to be transmitted.

At 304, the client computer may receive data from the NFC device. The data may be directly associated with a service requested by the client computer and it may comprise various data identifying the NFC device. Additionally, the data may be detected, received and processed by the client computer.

At 306, the client computer generates a reputation query based on different information it now has related to the NFC device.

At 308, the generated reputation query is sent to the reputation server.

At 310, the reputation server retrieves the requested reputation data from the reputation database. Additionally, the reputation server may carry out further reputation analysis based on the information from the received reputation query and/or the reputation database.

At 312, the reputation data is provided to the client computer.

At 314, the client computer may initiate further action based on the received reputation data and/or predetermined settings and/or user input.

Without limiting the scope, interpretation, or application of the claims appearing below, the technical effects of one or more of the example embodiments disclosed here improve security related to very short-range communications. NFC devices are quite often used in payment and other financially critical applications. For example, several new mobile phone models have NFC support intended for wireless credit card payment acceptance. Since NFC is not foolproof, we have already seen proof-of-concept attacks where NFC payment transactions have been hijacked. The embodiments of the invention help prevent hijacking of an NFC connection by building a database of NFC device information, such as NFC device location, type and reputation information.

In the following example use case scenario, a suspicious NFC device is identified based on location. NFC terminals may be rather static in their locations due to their nature, and any terminal that moves around may be rather suspicious, assuming that it is not a street vendor or similar mobile location. Thus, in an embodiment, the changed location of a specific NFC device may be taken into account when generating reputation information that relates to the NFC device. The location-based identification of suspicious NFC terminals may comprise the following steps:

1. User is at a bar and is using his mobile phone to pay for a drink,
2. An attacker hijacks the connection between the mobile phone and a payment terminal (NFC device) of the bar with a directional antenna,
3. The security application of the user's mobile phone makes a reputation query to a reputation server,
4. The reputation server notices that the NFC device to which the reputation query is implying is new, and that a different NFC terminal is supposed to be at that specific location,
5. The reputation server responds with a suspicious reputation because the NFC device data that is received in the query is not consistent with the data in the reputation database,
6. The user is warned about the possibility that the connection may not be trustworthy.

In the next example use case scenario, a suspicious NFC device is identified by type. One type of NFC attack is to fool the user into connecting to an NFC terminal that is of a different type than the user expects. For example, the user may think that she is showing her mobile phone at a ticket checking or boarding pass access point that is actually under the control of attackers and tries to authorize a transaction. The example implementation may comprise the following steps:

1. User shows his mobile phone at an NFC access point to check the validity of his bus ticket,
2. The attacker may be using an antenna or has compromised the access point to authorize a monetary transaction,
3. The security application of the user's mobile phone makes a reputation query to a reputation server,
4. The original access point is listed as a ticket checking terminal in the reputation database,
5. The reputation server responds that the NFC terminal in the given location is a trusted ticket checking terminal,
6. The security application then detects that there is a difference between the type of operation that the NFC terminal is trying to do and what kind of operations should be going on based on information from the reputation database,
7. The security application warns the user that the NFC terminal may not be trusted,
8. The security application also informs the reputation server about the detected conflict between the device types and/or the attempted operations.

In an embodiment, it is also possible to use decisions of other client computers for guiding reputation decisions relating to NFC devices. For example, if several users have denied transactions with a given NFC terminal, then the reputation of this NFC terminal may be set to suspicious. Furthermore, if fraud reports on a specific NFC terminal are received from several users, then the reputation of the NFC terminal may be set to untrusted. Additionally, if the reputation server receives fraud information on a specific NFC terminal from a credit card company or any other third party feed, then the NFC terminal may be set to untrusted.

In an embodiment, a local database, such as a local caching database or a local heuristic engine, can also be maintained to store user's own historical data related to reputation of NFC terminals Thus, in addition to requesting reputation data from the reputation server, further reputation data can be retrieved from the local database, and the step of taking further action may then also be based on the additional reputation data retrieved.

The steps, points, signaling messages and related functions described above in relation to FIGS. 2 and 3 are in no absolute chronological order, and some of the steps may be performed simultaneously or in a different order. Other functions may also be executed between the steps or within the steps, and other signaling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or modules of hardware or their combinations thereof. For software, implementation can be through modules, for example, procedures and functions that perform the functions described here. The software code may be stored in any suitable data storage medium that is readable by processors, computers, memory unit(s) or articles(s) of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or article of manufacture which can contain, store, or maintain programming, data or digital information for use by or in connection with an instruction execution system, including the processor 3, 26 in the exemplary embodiments.

An embodiment provides a computer program product that comprises a computer-readable medium bearing computer program code embodied therein for use with a computer. The computer program code comprises code for receiving near field communication (NFC) device data related to a specific NFC device, code for generating a reputation query on the basis of the received NFC device data, code for sending the generated reputation query to a service provider, code for receiving reputation data, retrieved from a reputation database of NFC device reputation information, related to the specific NFC device from the service provider, and code for taking further action on the basis of the received reputation relating to the specific NFC device.

An embodiment provides a computer program product that comprises a computer-readable medium bearing computer program code embodied therein for use with a computer. The computer program code comprises code for maintaining a reputation database comprising near field communication (NFC) device reputation information, code for receiving, from a computing device, a reputation query comprising NFC device data of a specific NFC device, code for retrieving the reputation data relating to the specific NFC device from the reputation database, and code for sending the retrieved reputation data to the computing device.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations that are explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

What is claimed is:

1. A method of operating a computer system, comprising:
   receiving near field communication (NFC) device data related to a specific NFC device operating as a payment terminal and being involved in authorizing a payment on behalf of a user of the computer system;
   generating a reputation query on the basis of the received NFC device data;
   sending the generated reputation query to a service provider via at least one transmission network independent of the specific NFC device;
   receiving reputation data, retrieved from a reputation database of NFC device reputation information, related to the specific NFC device from the service provider via the at least one transmission network; and
   when, based at least partially on the received reputation data relating to the specific NFC device, the received reputation data implies that the specific NFC device is suspicious or unknown, informing the user that a suspicious or unknown NFC device has contacted the computer system.

2. The method of claim 1, further comprising: receiving the NFC device data via a near field communication link from the NFC device.

3. The method of claim 1, further comprising: including further data related to the to the generated reputation query.

4. The method of claim 1, wherein the generated reputation query comprises one or more of the following: information identifying the NFC device, frequency information, NFC communication data rate, communication mode used, data coding system information, NFC device type, physical location of the NFC device, a uniform resource identifier provided by the NFC device, textual content of the NFC device, price information associated with the NFC device.

5. The method of claim 1, wherein the received reputation data comprises an indication of whether the NFC device is trusted, suspicious or unknown.

6. The method of claim 1, wherein the further action comprises any of the following: preventing or allowing communicating with the NFC device, preventing or allowing using services offered by the NFC device, closing applications triggered by the NFC device, displaying a warning message, allowing only specific type of communication with the NFC device.

7. The method of claim 1 further comprising: when, based at least partially on the received reputation relating to the specific NFC device, the reputation data implies that the specific NFC device is suspicious or unknown, preventing a software application of the computer system from making the payment.

8. A method, comprising:
   maintaining a reputation database comprising near field communication (NFC) device reputation information regarding near field communication (NFC) devices which operate as payment terminals;
   receiving, from a computing device, a reputation query comprising NFC device data of a specific NFC device via at least one transmission network independent of the specific NFC device;
   based at least partially on the received NFC device data received from the computing device, retrieving the reputation information relating to the specific NFC device from the reputation database, where the retrieved reputation information implies that the specific NFC device is suspicious or unknown; and
   sending the retrieved reputation information to the computing device via the at least one transmission network, where the retrieved reputation information is configured to indicate to the computing device to inform a user that a suspicious or unknown NFC device has contacted the computing device.

9. The method of claim 8, wherein the reputation database comprises one or more of the following: information identifying the NFC device, frequency information, NFC communication data rates, communication modes used, data coding system information, NFC device types, physical locations of NFC devices, uniform resource identifiers provided by NFC devices, textual contents of the NFC devices, price information associated with the NFC devices, ages of NFC devices in the reputation database, known fraud or other security issue histories of NFC devices.

10. The method of claim 8, wherein the retrieved reputation data information comprises an indication of whether the NFC device is trusted, suspicious or unknown.

11. The method of claim 10, wherein the indication of the NFC device being suspicious is based on detecting that the NFC device is new and/or that a different NFC device has previously been at the physical location of the NFC device.

12. The method of claim 10, wherein the indication of the NFC device being suspicious is based on detecting that the type of the NFC device is different than the NFC device type listed in the reputation database at the physical location of the NFC device.

13. The method of claim 10, wherein the indication of the NFC device being suspicious is based on detecting received previous negative decisions relating to the NFC device from other computer devices.

14. The method of claim 1, further comprising: retrieving further reputation data from a local database, and the step of taking further action is also based on the retrieved further reputation data.

15. A computing device, comprising:
at least one processor; and
at least one non-transitory memory including computer program code,
the at least one non-transitory memory and the computer program code configured to, with the at least one processor, cause the device to perform at least the following:
receive near field communication (NFC) device data related to a specific NFC device operating as a payment terminal and being involved in authorizing a payment on behalf of a user of the computing device;
generate a reputation query on the basis of the received NFC device data;
send the generated reputation query to a service provider via DB at least one transmission network independent of the specific NFC device;
receive reputation data, retrieved from a reputation database of NFC device reputation information, related to the specific NFC device from the service provider via the at least one transmission network; and
when, based at least partially on the received reputation data relating to the specific NFC device, the received reputation data implies that the specific NFC device is suspicious or unknown, inform the user that a suspicious or unknown NFC device has contacted the computing device.

16. The computing device of claim 15, wherein the device is further configured to receive the NFC device data via a near field communication link from the NFC device.

17. The computing device of claim 15, wherein the further action comprises any of the following: preventing or allowing communicating with the NFC device, preventing or allowing using services offered by the NFC device, closing applications triggered by the NFC device, displaying a warning message, allowing only specific type of communication with the NFC device.

18. The computing device of claim 15 where when, based at least partially on the received reputation data relating to the specific NFC device, the reputation data implies that the specific NFC device is suspicious or unknown, the device is further configured to prevent a software application from making the payment.

19. A server, comprising:
at least one processor; and
at least one non-transitory memory including computer program code, the at least one non-transitory memory and the computer program code configured to, with the at least one processor, cause the server to perform at least the following:
maintain a reputation database comprising near field communication (NFC) device reputation information regarding near field communication (NFC) devices which operate as payment terminals;
receive, from a computing device, a reputation query comprising NFC device data of a specific NFC device, via at least one transmission network independent of the specific NFC device;
based at least partially on the received NFC device data received from the computing device, retrieve the reputation information relating to the specific NFC device from the reputation database, where the retrieved reputation information implies that the specific NFC device is suspicious or unknown; and
send the retrieved reputation information to the computing device via the at least one transmission network, where the retrieved reputation information is configured to indicate to the computing device to inform a user that a suspicious or unknown NFC device has contacted the computing device.

20. The server of claim 19, wherein the reputation database comprises one or more of the following: information identifying the NFC device, frequency information, NFC communication data rates, communication modes used, data coding system information, NFC device types, physical locations of NFC devices, uniform resource identifiers provided by NFC devices, textual contents of the NFC devices, price information associated with the NFC devices, ages of NFC devices in the reputation database, known fraud or other security issue histories of NFC devices.

21. The server of claim 19, wherein the retrieved reputation information comprises an indication of whether the NFC device is trusted, suspicious or unknown.

22. A computer program product comprising a non-transitory computer-readable medium bearing computer program code embodied therein for use with a computer, the computer program code comprising:
code for receiving near field communication (NFC) device data related to a specific NFC device operating as a payment terminal and being involved in authorizing a payment on behalf of a user of the computer;
code for generating a reputation query on the basis of the received NFC device data;
code for sending the generated reputation query to a service provider via at least one transmission network independent of the specific NEC device;
code for receiving reputation data, retrieved from a reputation database of NFC device reputation information, related to the specific NFC device from the service provider, via the at least one transmission network; and
code for taking further action when, based at least partially on the received reputation data relating to the specific NFC device, the received reputation data implies that the specific NFC device is suspicious or unknown, the further action comprising informing the user that a suspicious or unknown NFC device has contacted the computer.

23. A computer program product comprising a non-transitory computer-readable medium bearing computer program code embodied therein for use with a computer, the computer program code comprising:
code for maintaining a reputation database comprising near field communication (NFC) device reputation information regarding near field communication (NFC) devices which operate as payment terminals;
code for receiving, from a computing device, a reputation query comprising NFC device data of a specific NFC device, via at least one transmission network independent of the specific NFC device;
code for retrieving, based at least partially on the received NFC device data received from the computing device, the reputation information relating to the specific NFC device from the reputation database, where the retrieved reputation information implies that the specific NFC device is suspicious or unknown; and
code for sending the retrieved reputation information to the computing device via the at least one transmission network, where the retrieved reputation information is configured to indicate to the computing device to inform a user that a suspicious or unknown NFC device has contacted the computing device.

\* \* \* \* \*

UNITED STATES PATENT AND TRADEMARK OFFICE
CERTIFICATE OF CORRECTION

| | |
|---|---|
| PATENT NO. | : 9,055,101 B2 |
| APPLICATION NO. | : 13/271519 |
| DATED | : June 9, 2015 |
| INVENTOR(S) | : Kimmo Kasslin and Jarno Niemelä |

It is certified that error appears in the above-identified patent and that said Letters Patent is hereby corrected as shown below:

Claims

In Claim 22:
Column 12, line 32, "NEC" should be deleted and -- NFC -- should be inserted.

Signed and Sealed this
Seventeenth Day of November, 2015

Michelle K. Lee
*Director of the United States Patent and Trademark Office*